(12) United States Patent
Wilkendorf (10) Patent No.: US 10,066,652 B2
(45) Date of Patent: Sep. 4, 2018

(54) FILTER DEVICE (71) Applicant: HYDAC FILTERTECHNIK GMBH, Sulzbach/Saar (DE)

(72) Inventor: Werner Wilkendorf, Ottweiler (DE)

(73) Assignee: HYDAC FILTERTECHNIK GMBH, Sulzbach/Saar (DE)

(*) Notice: Subject to any disclaimer, the term of this patent is extended or adjusted under 35 U.S.C. 154(b) by 357 days.

(21) Appl. No.: 14/773,577

(22) PCT Filed: Jan. 16, 2014

(86) PCT No.: PCT/EP2014/000097
§ 371 (c)(1),
(2) Date: Sep. 8, 2015

(87) PCT Pub. No.: WO2014/139613
PCT Pub. Date: Sep. 18, 2014

(65) Prior Publication Data
US 2016/0017900 A1    Jan. 21, 2016

(30) Foreign Application Priority Data

Mar. 9, 2013 (DE) .................. 10 2013 004 142

(51) Int. Cl.
*F15B 21/04* (2006.01)
*B01D 35/157* (2006.01)
(Continued)

(52) U.S. Cl.
CPC ............ *F15B 21/041* (2013.01); *B01D 29/54* (2013.01); *B01D 29/58* (2013.01); *B01D 35/147* (2013.01);
(Continued)

(58) Field of Classification Search
CPC ........ B01D 2201/295; B01D 2201/342; B01D 2201/4084; B01D 29/54; B01D 29/58;
(Continued)

(56) References Cited

U.S. PATENT DOCUMENTS 3,224,583 A    12/1965   Rosaen
3,269,541 A *   8/1966   Neely .................... B01D 27/02
                                                          210/132

(Continued)

FOREIGN PATENT DOCUMENTS

DE    10 2009 032 572    1/2011
EP    0 502 411          9/1992

OTHER PUBLICATIONS

International Search Report (ISR) dated May 12, 2014 in International (PCT) Application No. PCT/EP2014/000097.

*Primary Examiner* — Pranav N Patel
(74) *Attorney, Agent, or Firm* — Wenderoth, Lind & Ponack, L.L.P.

(57) ABSTRACT

A filter device has a first connection (A1) to a hydraulic working circuit, an associated filter element (F1) and an additional connection (A2) by which leakage oil amounts of hydraulic components can be fed. A control apparatus (V2) can feed the leakage oil amounts from the additional connection (A2) to the filter element (F1) when a specified working pressure of the working circuit is not reached at the first connection (A1).

25 Claims, 12 Drawing Sheets

(51) Int. Cl.
    *B01D 29/54*     (2006.01)
    *B01D 35/147*    (2006.01)
    *B01D 35/153*    (2006.01)
    *B01D 29/58*     (2006.01)

(52) U.S. Cl.
    CPC ...... *B01D 35/153* (2013.01); *B01D 2201/295* (2013.01); *B01D 2201/342* (2013.01); *B01D 2201/4084* (2013.01); *F15B 2211/611* (2013.01); *F15B 2211/615* (2013.01)

(58) Field of Classification Search
    CPC ... B01D 35/147; B01D 35/153; F15B 21/041; F15B 2211/611; F15B 2211/615
    See application file for complete search history.

(56) References Cited

U.S. PATENT DOCUMENTS

| | | | |
|---|---|---|---|
| 3,344,923 A * | 10/1967 | Silverwater | B01D 29/21 210/132 |
| 3,945,208 A | 3/1976 | O'Connor | |
| 5,355,773 A | 10/1994 | Winkels | |
| 2010/0065481 A1 * | 3/2010 | Formica | B01D 29/21 210/133 |
| 2010/0140155 A1 * | 6/2010 | Gift | B01D 27/103 210/232 |
| 2010/0257824 A1 * | 10/2010 | Wilkendorf | B01D 29/21 55/312 |

* cited by examiner

FILTER DEVICE

FIELD OF THE INVENTION

The invention relates to a filter device with at least one first port in a hydraulic working circuit, a filter element assigned to the hydraulic working circuit and at least one additional port, which can be used to supply the leakage oil of hydraulic components.

BACKGROUND OF THE INVENTION

Filter devices of this type are prior art in a wide range of designs. In hydraulic systems, the return flow from working hydraulics, for example, in the form of working cylinders, is filtered in an open hydraulic circuit. From a closed hydraulic circuit of the associated hydrostatic drive, such as pumps or motors, oil leakage flows incur. Problems arise in connection with the filtration of the resulting leak-oil. In view of maintaining the required system purity, the filter element of the working filter, filtering the return flow from the working hydraulics, has to be designed with a high grade of filtration to ensure microfiltration of the return flow. If the return flow is high volume, if the hydraulic fluid is high viscosity (cold conditions) or in case of considerable contamination of the filter element, relatively high back pressures result at the working filter. This high pressure precludes using the working filter designed for large filtration grade for superfine filtration of resulting leak-oil, as the leak-oil producing components, such as pumps or motors, do not tolerate higher leak-oil pressures because of their shaft bushings and gaskets. Provisions must then be made for leak-oil filtration, for example, separate leak-oil filters of a coarser filtration grade, to avoid higher back pressures, which in turn has negative effects on system purity.

SUMMARY OF THE INVENTION

An object of the invention is to provide a filter device of the type under consideration, allowing for an efficient filtration of any incurred leak-oil flow in a particularly simple manner.

According to the present invention, this object is basically achieved by a filter device having, as one special feature of the invention, a control device. If the working pressure of the working circuit at the first port falls below a specified value, the leakage oil quantities can be supplied to the filter element by an additional port. Thereby, the invention makes use of the fact that in recent times, in particular for mobile devices in an open hydraulic working circuit, more and more fixed displacement pumps are replaced by variable pumps in the interest of improved energy efficiency. As a consequence, the quantities of oil that are returned through the working filter having a filter element designed for high grade filtration vary greatly in accordance with the load profile of the relevant working hydraulics and decrease in absolute terms. During prolonged periods of operation in which the variable displacement pump in question performs at partial load or is completely swiveled back, no or very little back pressure is at the filter element of the working filter. The control device provided in accordance with the invention routes the leak-oil flow from the additional port to the filter element, to utilize the working filter for the ultra-fine filtration of the leak-oil flow during these operating phases, i.e. whenever the working pressure of the working circuit falls below a pre-selectable value at the first port. By using the microfilter of the hydraulic working circuit for filtering the leak-oil flow, a better overall oil quality can be achieved.

In an especially advantageous exemplary embodiment, the control device has a valve assembly having at least one check valve. The check valve connects the additional port to the first port, if the leak-oil pressure at the additional port exceeds the working pressure at the first port. This provision ensures in a simple way that any pressure building up at the microfilter cannot act on the leak-oil port.

An arrangement in which the control device has a second check valve connected to the additional port, i.e. the leakage oil port, is of particular advantage. The second check valve opens when a desired range of the leak-oil pressure is exceeded and connects the additional port to a branch line leading to a return or tank side. This way, the control device effectively limits the pressure of the leakage oil.

In particularly advantageous exemplary embodiments, a second filter element is provided in the branch line leading from the second check valve to the return or tank side. The second filter element has a filter grade coarser than that of the first filter element disposed between the first port and the return or tank side. This way, filtration of the leak-oil also occurs in those operating phases in which the leak-oil port is disconnected from the port at the fine filtering working filter. A detrimental increase in the leakage oil pressure is avoided by a coarser filter grade of this effective second filter element.

Particularly advantageously, the control unit may have a third check valve connecting the first port to the additional port, as soon as a pre-determined maximum value of the working pressure at the first port is exceeded. The first filter element is then bypassed via a second filter element.

Particularly advantageously, a further bypass, bypassing the second filter element can also be set up, by providing a fourth check valve. The fourth check valve is opened by the pressure present at the second port. A screen can be placed in the other bypass as a "last chance filter".

In advantageous exemplary embodiments, a supply port may be connected to the clean side of at least the first filter element and/or second filter element for feeding filtered hydraulic fluid to hydrostatic components, such as feed pumps.

To safeguard the supply of such components via the supply port, the clean side of the first filter element and/or second filter element, and thus the supply port, is connected to a tank via a replenishment device. The replenishment device has a fifth non-return valve in the form of a suction valve and a sixth non-return valve for a desired loading of the hydraulic fluid present at the supply port, and is particularly advantageous.

A high purity of the system is ensured thereby, if the replenishment device has a suction filter, filtering the corresponding replenishment volumes, in series with the fifth check valve.

In a particularly advantageous manner, the filter device may have a filter housing defining a longitudinal axis. The filter housing can accommodate, in a sequential configuration and interconnected interrelated, a first filter element serving as a microfilter and a second filter element in the form of a coarse protective filter. By arranging both filters in a common housing, not only can a compact design be realized, but the device is also easy to maintain, because only one component needs to be replaced to change the filter.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
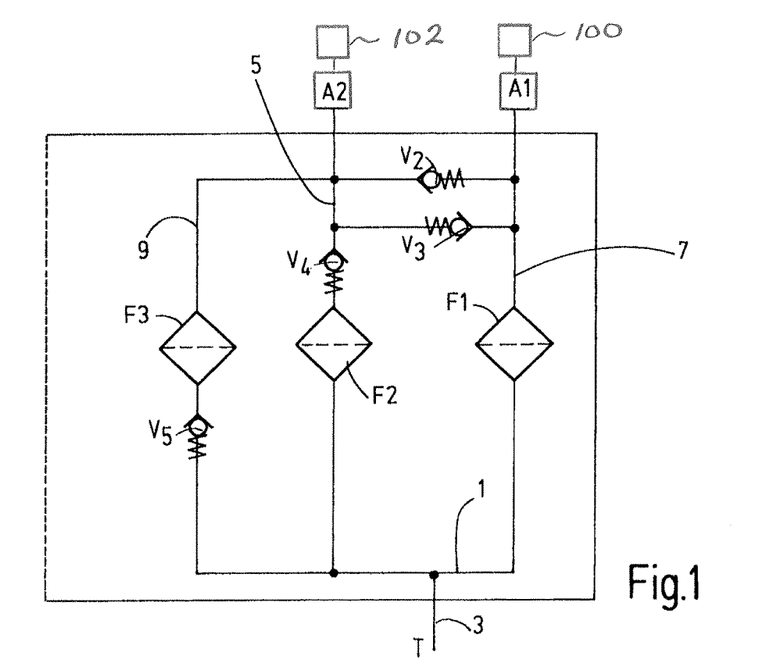
FIG. 1 is a circuit diagram of the hydraulic components of a filter device according to a first exemplary embodiment of the present invention.

The circuit example in FIG. 1 shows a port A1 to which a fluid return flow is directed from a working hydraulics (100). For microfiltering the return flow, the port A1 is connected to a filter element F1 with a filter grade in the range 5-10 μm. The clean side 1 of filter element F1 leads to a tank side 3. Leak-oil or leakage oil, incurred in the operation of hydrostatic drives (102) for the working hydraulics concerned, is supplied via a second port A2. This leak-oil line 5 connected to this drain oil port A2 is connected to the port A1 via a check valve $V_2$ and thus to the dirty side 7 of the filter element F1. The spring-loaded check valve $V_2$ opens from port A2 to port A1 at a low opening pressure, for example at approx. 0.03 bar. The leak-oil line 5 is also connected to the dirty side of a second filter element F2 serving as leak-oil-protection filter. The second filter element is connected to the tank side 3 on its clean side. The check valve $V_4$ is set, for example as a pressure relief valve on the leak-oil line 5, to an opening pressure of 0.5 bar, to limit the pressure of the leak-oil line 5 to this leak-oil pressure. In operation, the check valves $V_2$ and $V_4$ form a control device, configuring the filtration of incurred leak-oil in such a way that in operating phases, in which the working pressure at the port A1 is lower than the leak-oil pressure at port A2, the leak-oil is microfiltered via the filter element F1 via the open check valve $V_2$. When the working pressure at the port A1 increases due to large return quantities, due to high viscosities or due to contamination of the filter element F1, the valve $V_2$ closes. At a leak-oil pressure at port A2 exceeding the opening pressure of the other check valve $V_4$, in this case 0.5 bar, the leak-oil from the leak-oil line 5 is filtered through the second filter element F2. Second filter element F2 has, as a protective filter, a coarser grade of filtration, for example 40 μm, designed to prevent any detrimental leak-oil pressure from building up in the leak-oil line 5.

The working connection A1, and thus, the microfiltering filter element F1 are protected by a bypass formed by a further check valve $V_3$ between the ports A1 and A2. Check valve $V_3$ may be set to an opening pressure of 4 bar, for instance. When this check valve $V_3$ is opened, a corresponding bypass volume is filtered via the opening check valve $V_4$ and the coarser protection filter F2. The protection filter F2 is in turn protected by an additional bypass 9, emanating from the leak-oil port A2 and running via a strainer F3. Strainer F3 has a grade of filtration of 500 μm, for instance, as last-chance filter, via a spring-loaded check valve $V_5$ set to an opening pressure of about 2.0 bar, to the clean side 1, and thus, to the tank side 3.

Figure 2:
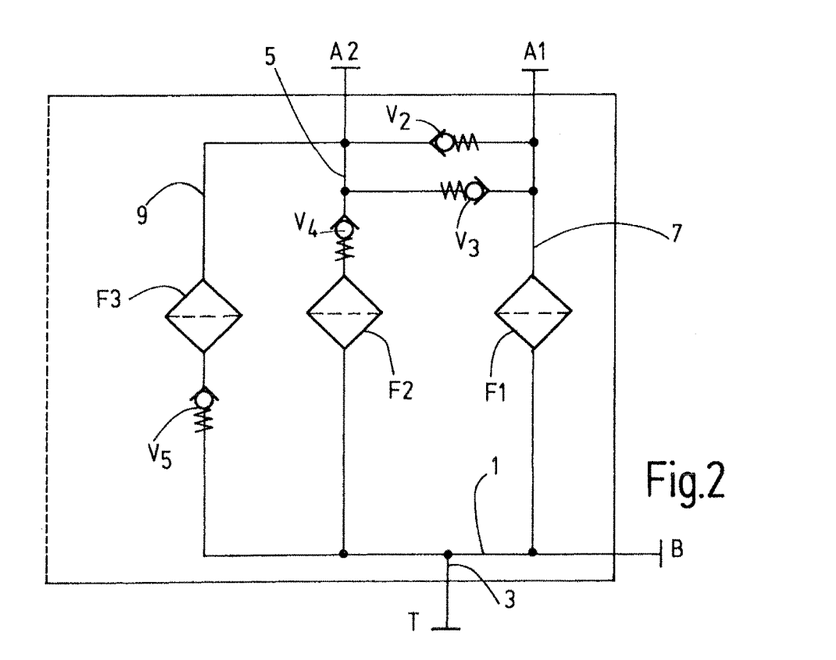
FIG. 2-5 are circuit diagrams of the hydraulic components of filter devices according to further exemplary embodiments of the invention.

The circuit diagram of FIG. 2 corresponds to that of FIG. 1, except that on the clean side 1 a supply port B for supplying hydraulic components, for example a feed pump of downstream hydrostats, with a filtered working fluid, is provided.

Figure 3:
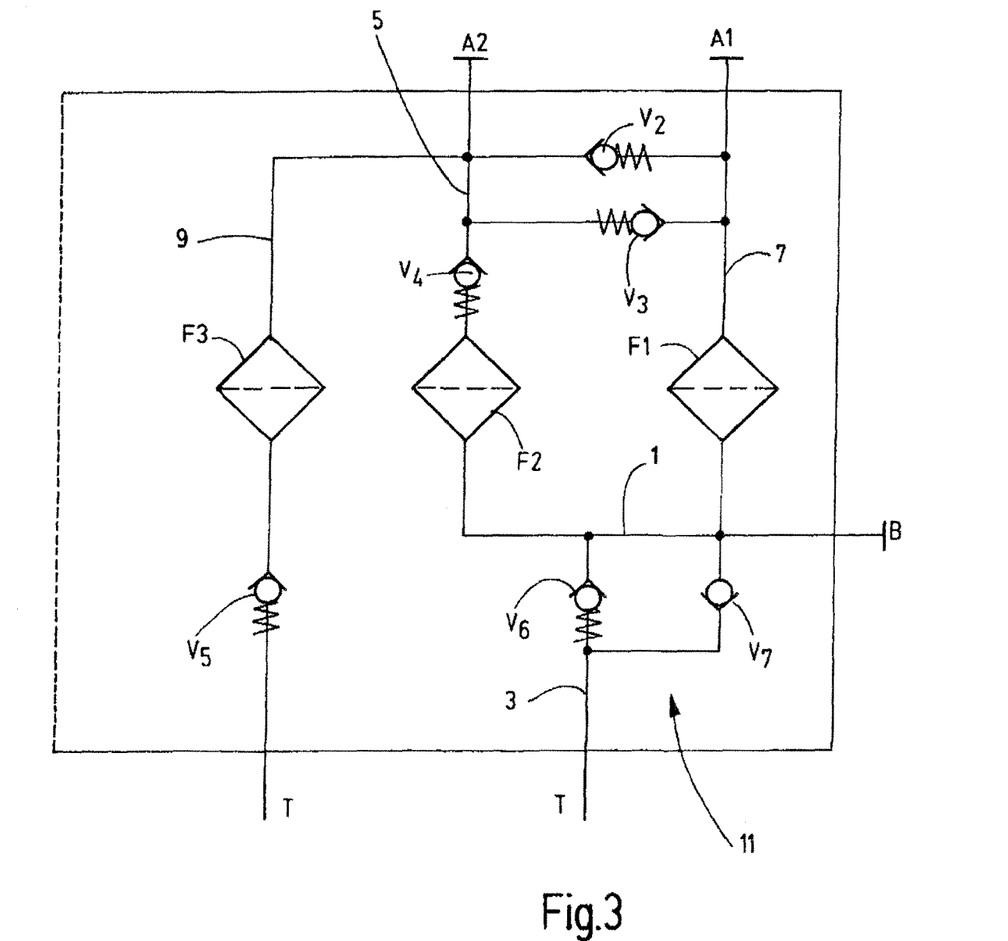

In the circuit example of FIG. 3, a replenishment device or circuit 11 with replenishment lines is provided as a development of the circuit of FIG. 2, in order to preclude any reduced supply at the supply port B. The replenishment device or circuit 11 has an unloaded check valve $V_7$, connecting the tank side 3 to the supply port B in case of negative pressure at the supply port B, and has a spring-loaded check valve $V_6$. Check valve $V_6$, as a counterbalance valve, pre-loads the clean side 1 and thus the supply port B to a supply pressure of 0.5 bar.

Figure 4:
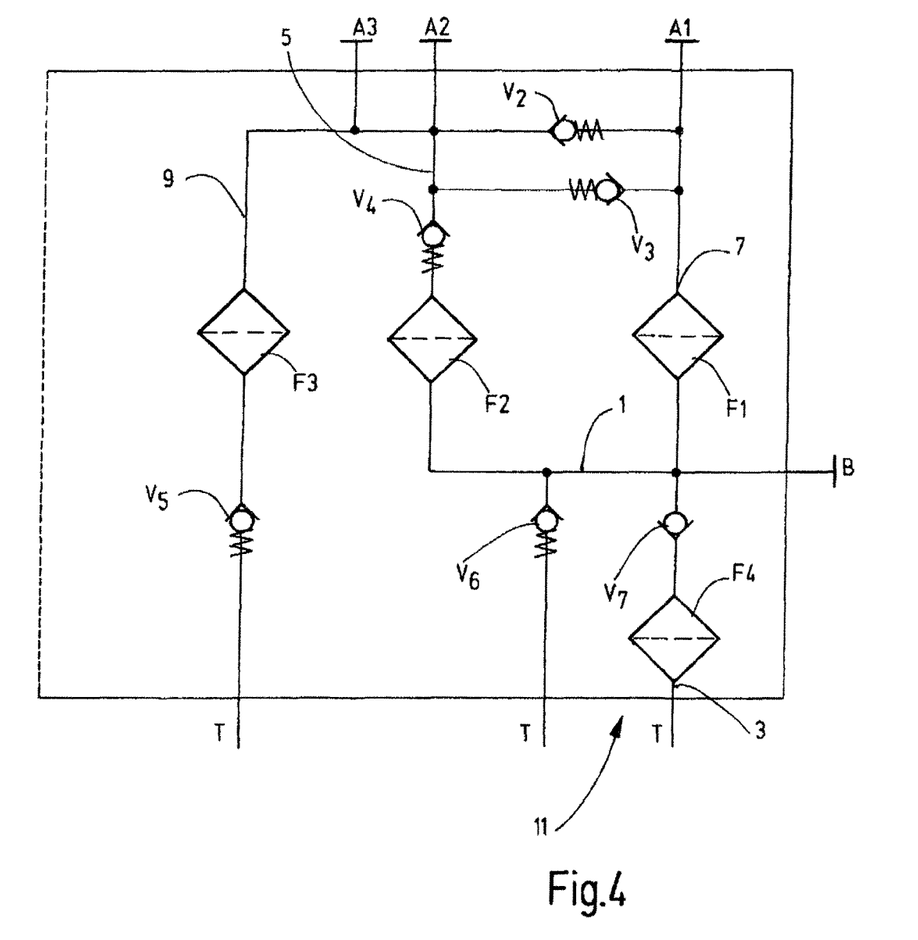

The circuit diagram of FIG. 4 corresponds to that of FIG. 3, except that, between the suction valve forming the check valve $V_7$ and the tank T, a suction filter F4 has been inserted, with a filter grade of 100 μm, for instance. In addition, an additional leak-oil port A3 in parallel to the first leak-oil port A2 is provided for supplying leak-oil from a further closed hydraulic circuit.

Figure 5:
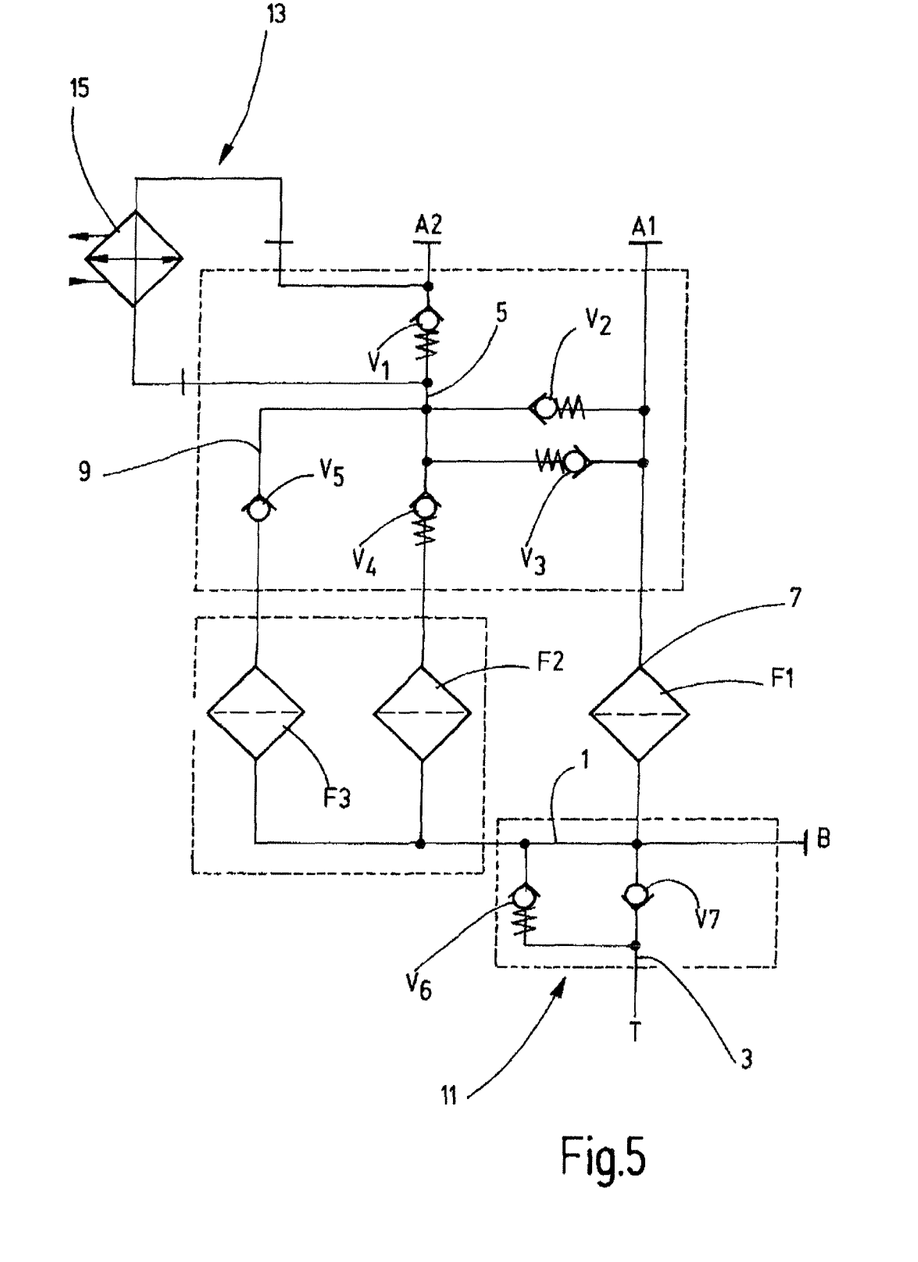

The diagram of FIG. 5 corresponds to the circuit example of FIG. 3, except that the drain port A2 is not directly connected to the leak-oil line 5 leading to the protection filter F2 via the check valve $V_4$. Rather, the resulting leak-oil flow is led through an external leak-oil cooling circuit 13 with a heat exchanger 15. The heat exchanger 15 is protected by a spring-loaded check valve $V_1$ with an opening pressure of 1.0 bar.

Figure 6:
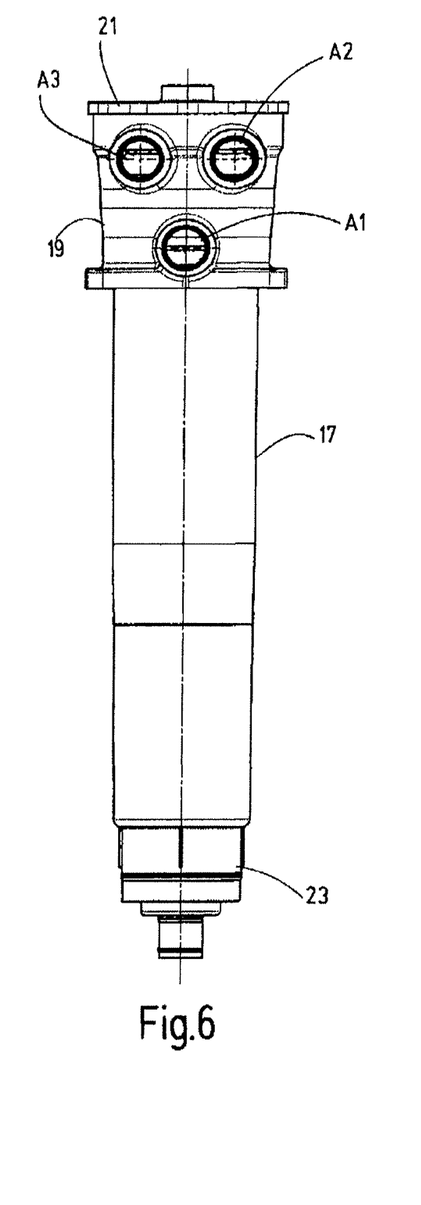
FIG. 6 is a front view of a filter housing of a filter device according to an exemplary embodiment of the present invention.
Figure 7:
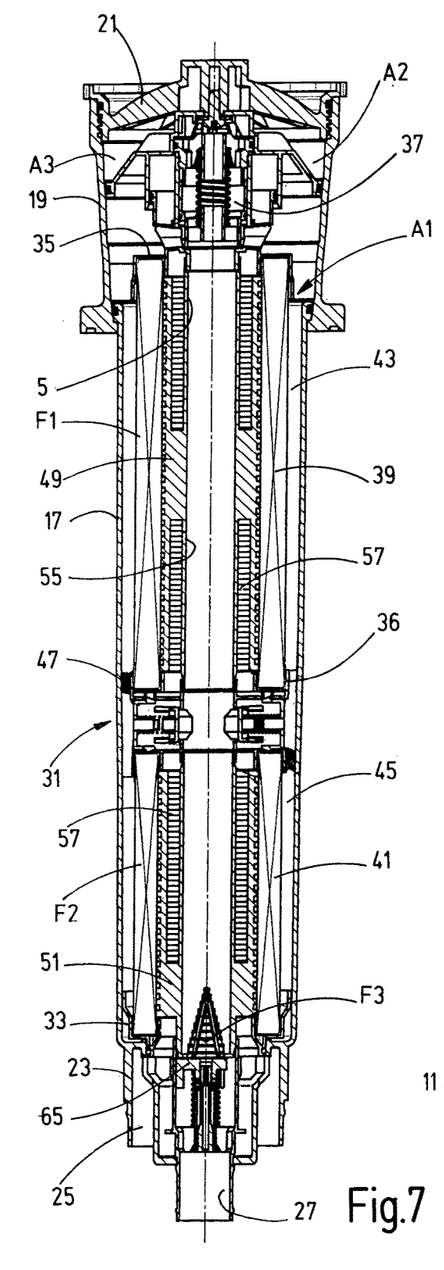
FIG. 7 is a front view in section of the filter housing of the exemplary embodiment of FIG. 6.
Figure 8:
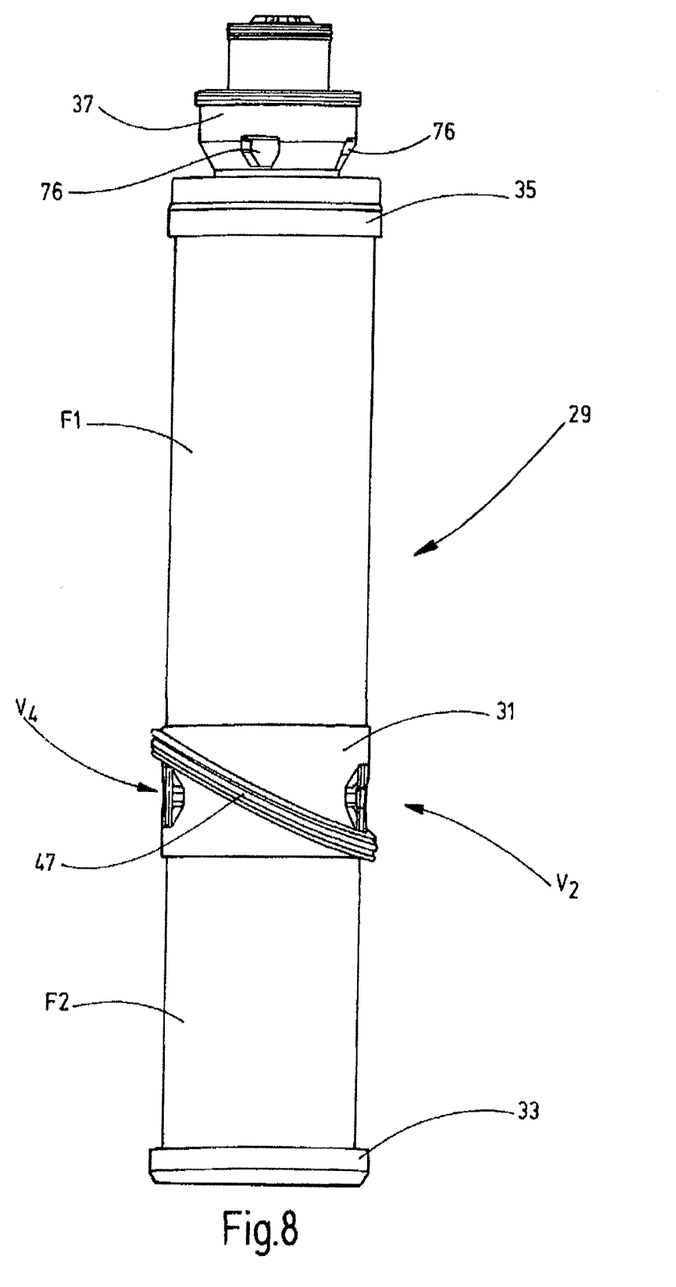
FIG. 8 is an enlarged (in comparison to FIG. 7), perspective view of a filtration insert made up of a combination of two filter elements of the exemplary embodiment of FIG. 6 and FIG. 7.

FIGS. 6 and 7 illustrate an exemplary embodiment of the filter device according to the present invention in front view and in longitudinal section, respectively. The corresponding hydraulic circuit having been realized in accordance with the circuit diagram of FIG. 1. The exemplary embodiment shows a circular cylindrical filter housing 17, tightly sealed by a head piece 19, which in turn is closed by a screw cap 21. At the other, bottom end, the housing 17 forms a bottom part 23 with outlets 25, 27 to an associated tank. The filter housing 17 can accommodate an interchangeable filter element 29, as shown separately in FIG. 8, featuring the filter element F1 serving as microfilter and the coarser protective filter F2 in a coaxial series arrangement. The filter elements F1 and F2 are, as can best be seen in FIG. 10, connected mechanically as well as connected to carry fluids by a valve insert 31 inserted between them. An end cap 33 is at the lower end of the protective filter F2. An end cap 35 is at the upper end of the microfilter F1. A bypass valve device 37 is connected to the upper end of the upper end cap 35. The filter cartridge 29 of FIG. 8 is used both in the exemplary embodiment of FIGS. 6, 7 and 9 to 11, as well as in another exemplary embodiment shown in FIGS. 12 to 15, which will be discussed later.

Figure 9:
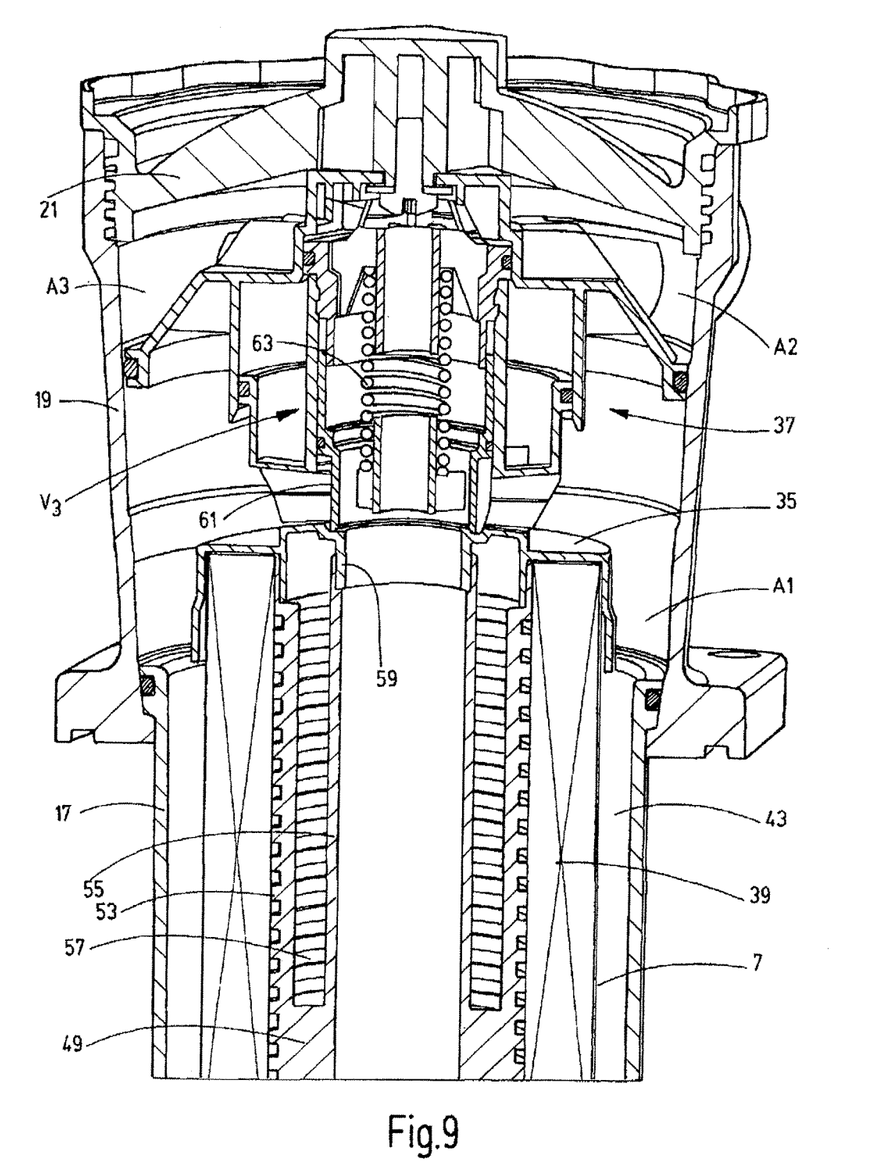
FIG. 9 is an enlarged (in comparison to FIG. 6 and FIG. 7) and partial perspective view in section of only the part of the exemplary embodiment of FIG. 6 and FIG. 7 that is adjacent to a removable head piece.
Figure 10:
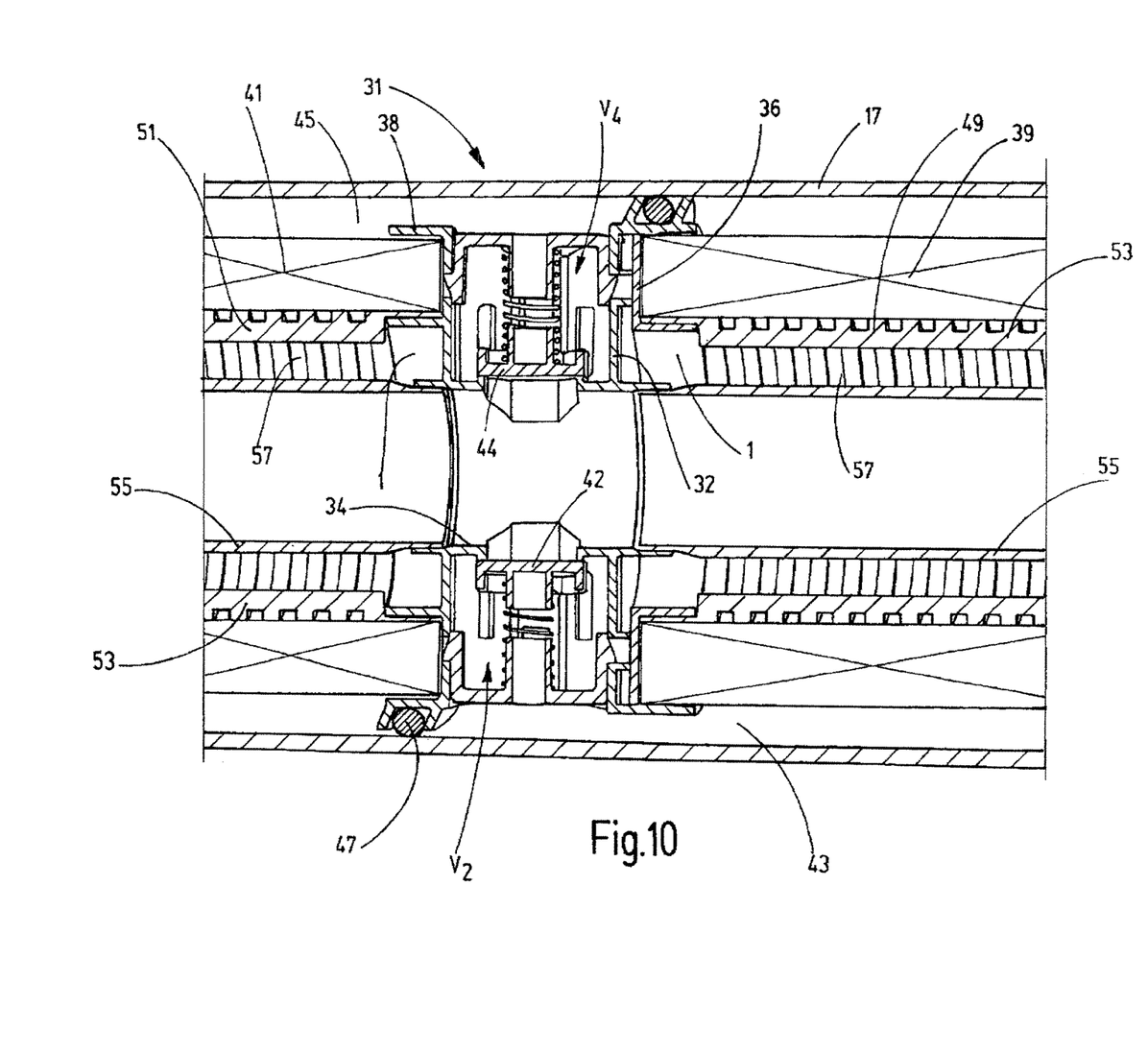
FIGS. 10 and 11 are partial, enlarged perspective views of the central housing part and the bottom housing part of the exemplary embodiment of FIG. 6 and FIG. 7, respectively.
Figure 11:
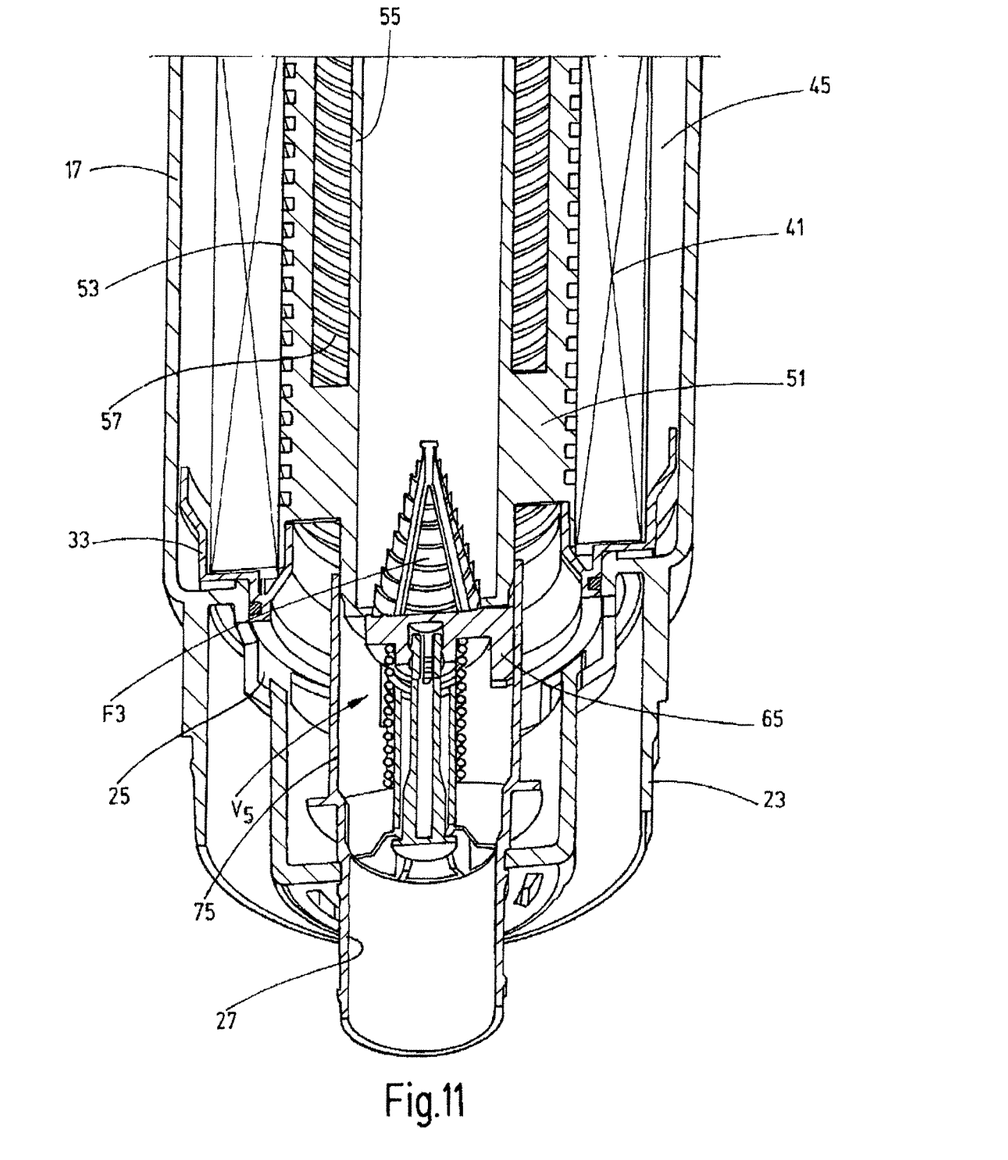

As FIG. 6 shows, the working port A1, receiving the return flow from an open hydraulic circuit (not shown), as well as disposed above, the terminals A2 and A3, connected in parallel for incurred leak-oil quantities, are disposed at the head piece 19. The fluid paths routed in the head piece 19, housing 17 and bottom part 23, emanating from the ports A1 and A2, A3, are best illustrated in FIGS. 9, 10 and 11. As shown, the outer side of the filter media 39 and 41 of the filter elements F1 and F2, respectively, is located in each case at a spacing to the inner wall of the housing 17. As a result, a first fluid chamber 43 is formed on the outside of the upper filter element F1, and a second fluid chamber 45 is formed on the outside of the lower filter element F2. The first fluid chamber 43 is connected to the working port A1 carrying the return flow (cf. FIG. 9), i.e. the first fluid chamber 43 forms the dirty side 7 in the filtration at the filter element F1. The first upper fluid chamber 43 and the second lower fluid chamber 45 are separated from each other by a sealing arrangement having a gasket 47, which, as FIG. 10 shows, seals the valve core 31 against the inner wall of the valve housing 17. The check valve $V_2$ and the check valve $V_4$ are located in the valve core 31, disposed diametrically to each other. As can be determined from FIGS. 8 and 10 in combination, the gasket 47 has a slanted course, such that the first upper fluid chamber 43 is extended towards the lower filter element F2 downwards, beyond the check valve $V_2$, while the lower, second fluid chamber 45 is extended upwards via the other check valve $V_4$. As can be seen in FIGS. 8 and 10, the inclined gasket 47 is held on the valve plate 31 in a peripheral annular gap, which is limited laterally by two projecting ribs enclosing the gasket 47. These projecting ribs form a support against the inner wall of the valve housing 17, and thus, safeguard against transverse forces owing to different pressures in the adjacent chambers.

In both filter elements F1 and F2, the filter medium 39 and 41, respectively, surrounds a support body 49 and 51, respectively. These each have a fluid-permeable outer wall 53 and a closed inner wall 55 located at a spacing thereto. Between them, walls 53, 55 form a space 57, receiving, as the clean side 1, the hydraulic fluid filtered by the second filter element F2. The closed inner wall 55 of the support bodies 49, 51 forms an inner tube, formed by the connection of the valve core 31 as a continuous fluid path from the head piece 19 to the bottom part 23. The fluid path in this inner tube is connected to the leak-oil port A2, A3 in the head piece 19 through an opening 59 (FIG. 9) in the upper end cap 35 of the filter element F1 via an internal passage in the bypass valve device 37 with fluid connection, thus forming a part of the leak-oil line 5, cf. FIGS. 1 to 5. If the leak-oil pressure exceeds 0.5 bar, the check valve $V_4$ located in the valve insert 31 opens by lifting its closing body 44 towards the second lower fluid chamber 45. In this manner, port A2 is connected to the outside of the second filter element F2 serving as a protective filter, i.e. its dirty side. The fluid reaches the chamber 57 via the filter medium 41 of the filter element F2, and thus, in turn the clean side 1. The respective clean side chambers 57 inside the support bodies 49 and 51 of the two filter elements F1, F2 are connected to each other by a flow around the valve insert 31, thus jointly forming the clean side 1 leading to the bottom part 23. In accordance with FIG. 10, the valve insert 31, as the valve housing of the check valves $V_2$ and $V_4$, widens a sleeve body 32 having a central passage 34, which continues the inner tube formed by the inner walls 55 of the support bodies 49, 51. On one side the valve insert 31 forms a holder for the adjacent end cap 36 of the upper filter element F1. On the other side an end cap 38 encloses the filter medium 41 of the lower filter element F2. As FIG. 11 shows most clearly, the clean side chamber 57 of the lower support body 51 is open towards the tank via the outlets 25 in the bottom part 23.

In the head piece 19, the spring-loaded check valve $V_3$ of the bypass valve assembly 37 can open a passage from the working port A1 to the opening 59 at the end cap 35 of the filter element F1. This opening occurs when an increase in pressure at the port A1 lifts a sleeve-shaped closing body 61 off from the edge of the opening 59 of the end cap 35 against the force of a valve spring 63 set to an opening pressure of 4 bar, cf. FIG. 9.

An additional bypass, designated 5 to 9 in FIG. 1, is formed at the lower end of the inner tube formed by the inner wall 55 of the support bodies 49, 51, by a spring-loaded closing body 65 of the check valve $V_5$ which, has been set to an opening pressure of 1.5 bar. The closing body 65 extends in a pipe section 75 forming the floor-side outlet 27 in the bottom part 23. The filter element F3 is located at the end closable by the closing body 65 of the tube formed by the inner wall of the support body 51, as a last-chance filter in the form of a strainer.

Figure 12:
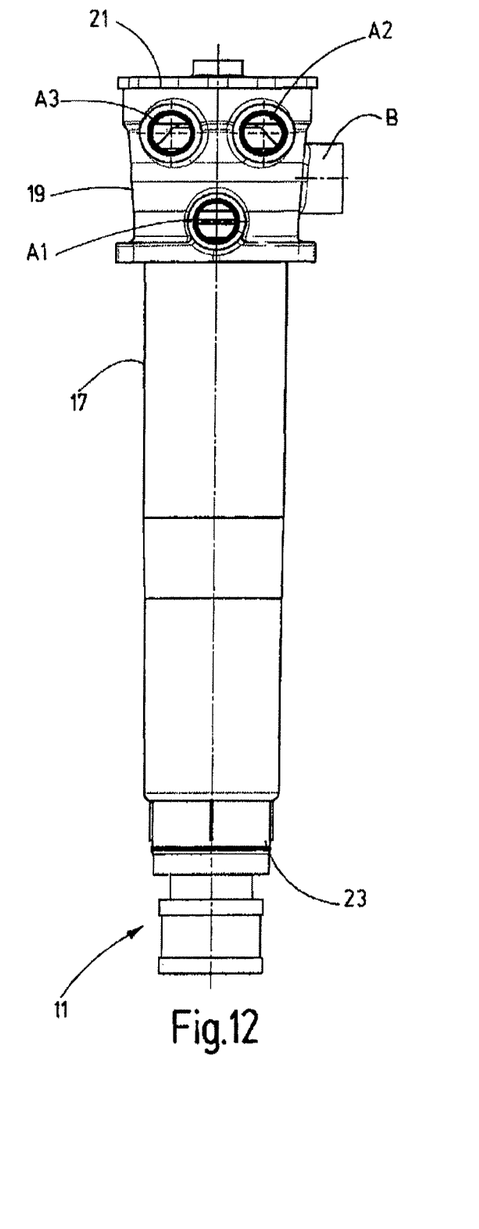
FIG. 12 is a front view of a filter housing of a filter device according to another exemplary embodiment of the present invention.
Figure 13:
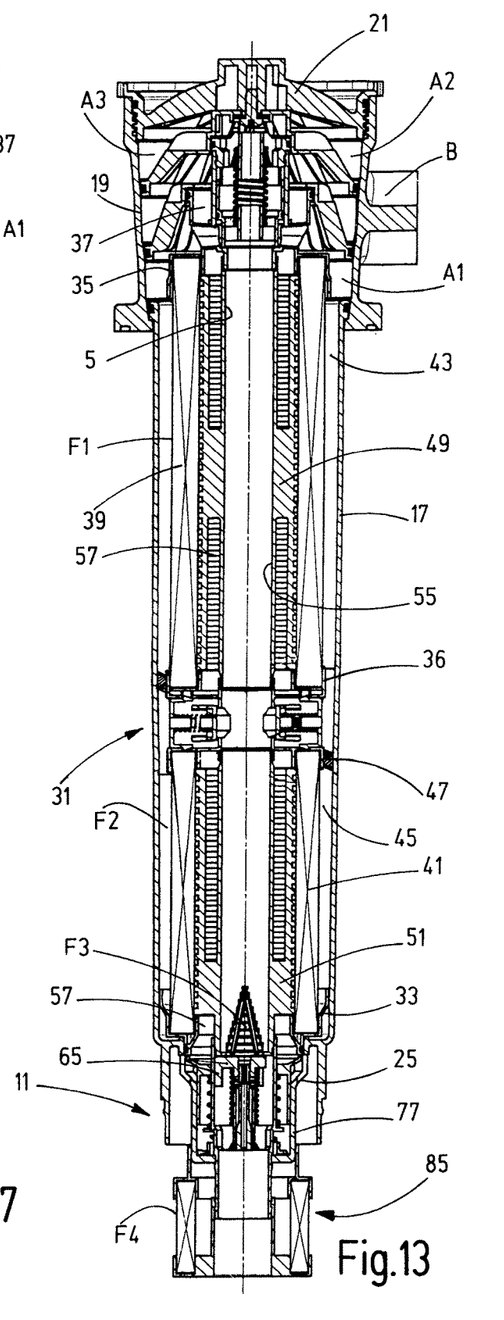
FIG. 13 is a front view in section of the filter housing of the exemplary embodiment of FIG. 12.
Figure 14:
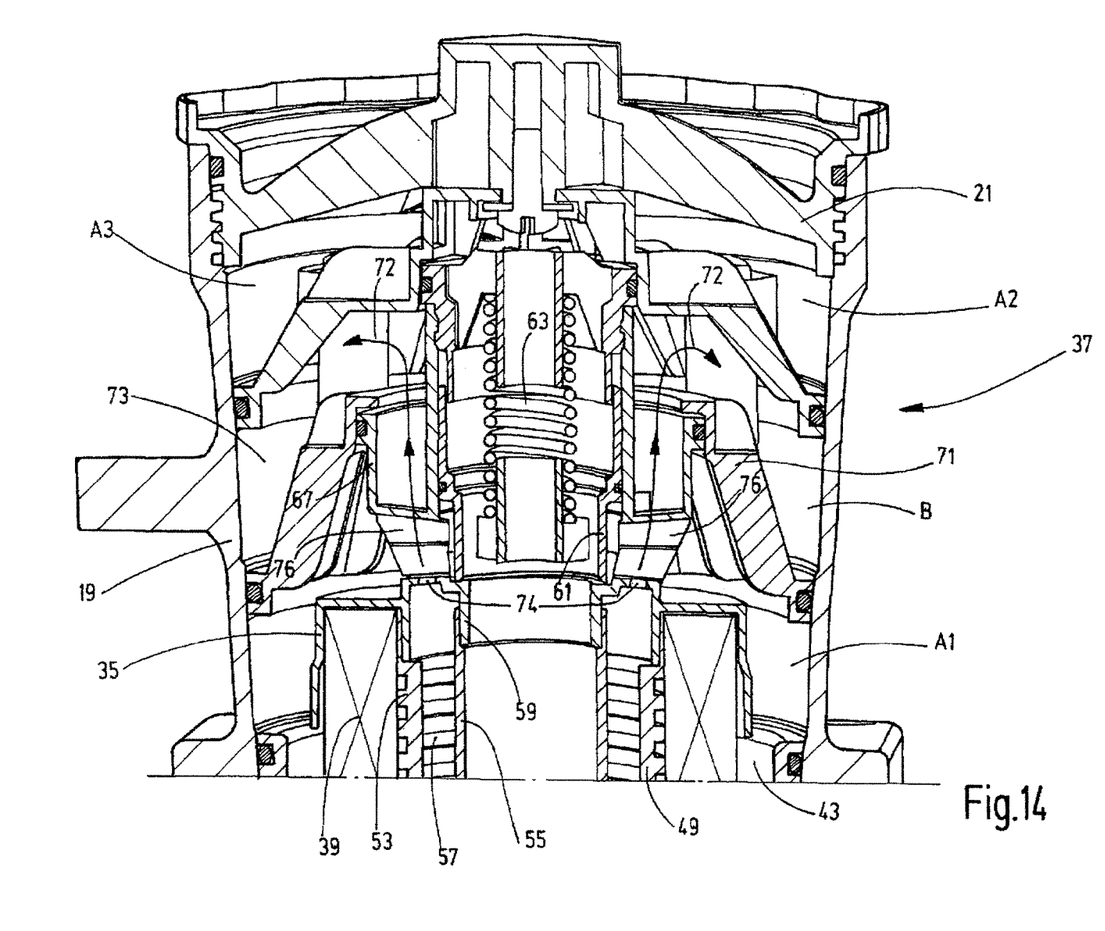
FIG. 14 is a partial perspective view in section of only the section of the exemplary embodiment of FIG. 13 adjacent to the head piece.

In the further exemplary embodiment of FIGS. 12 to 15, the circuit variant of FIG. 3 has been implemented. As FIGS. 12 and 13 show, the supply port B is located at the head piece 19 of the filter housing 17 in addition to the ports A1, A2 and A3, halfway between port A1 and ports A2 and A3 offset from these ports A1, A2, A3 by 90°. In this exemplary embodiment, the central portion of the filter housing 17 is designed identically to the first exemplary embodiment, therefore corresponding to the illustration of FIG. 10. The head piece 19 is, however, designed differently and has a partition wall 71, between the inner wall of the head piece 19 and a hollow cylindrical extension 67 of the end cap 35. Partition wall 71 surrounds the valve housing 69 of the bypass valve device 37 at a distance, separating the chamber in the head piece 19, to which port A1 leads, fluid-tight from the chamber, to which the ports A2, A3 lead, and forming a central chamber 73, leading to the supply port B. As indicated by flow arrows 72, a fluid path runs from the clean side chamber 57 of the support body 49 of the filter element F1 via passages 74 in the end cap 35 to the chamber 73 via fluid guides in the neck 67 of the end cap 35, the channels 76 being bypassed. The channels 76 form a fluid path from the opening 59 of the end cap 35 to the chamber of port A1, when the bypass valve device 67 responds to a lifting of the closing body 61.

Figure 15:
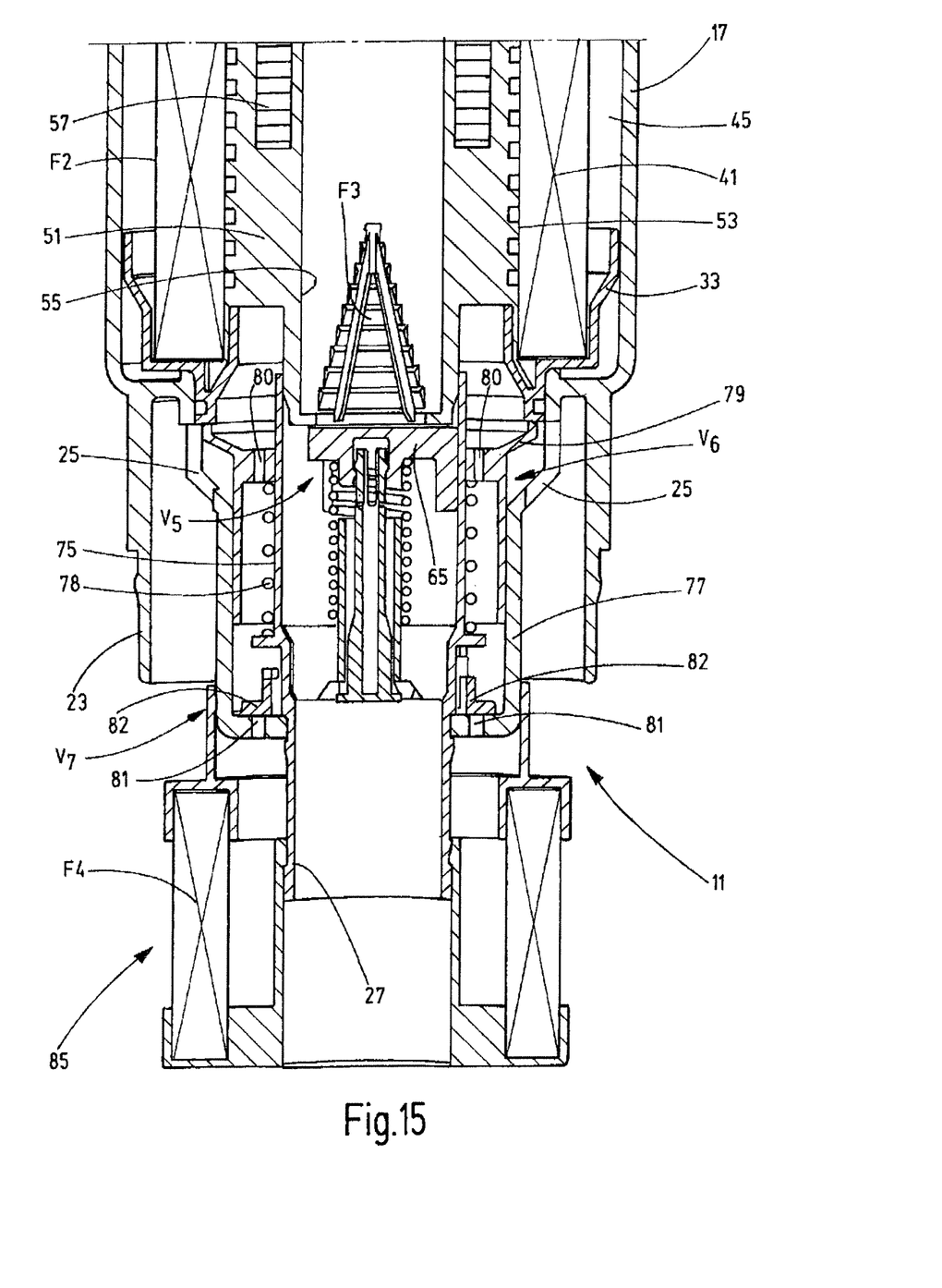
FIG. 15 is a partial perspective view in section of only the part of the exemplary embodiment of FIG. 13 and FIG. 14 that is adjacent to a bottom part of the housing.

In this exemplary embodiment, the bottom part 23 is also a modification of the previous example, cf. FIG. 15. The pipe 75 elongating the inner tube of the filter element F2, forming the tank-side outlet 27, surrounding the check valve $V_5$, forms, in conjunction with a coaxial cylindrical part 77 surrounding the tube 75 at a spacing thereto, a spring housing for the closing spring of the check valve $V_6$ forming a counterbalance valve. Its closing body 79, which is guided for lateral displacement in the spring housing, forms a seal of the clean side chamber 57 of the filter element F2 in the closed position. Passages 80 are formed in the closing body 79, however. The bottom of the cylindrical part 77 has, in addition to the penetration for the pipe 75, passages 81 as suction openings of the replenishment device 11, which, in conjunction with the associated closing bodies 82 form an unloaded check valve $V_7$ as a suction valve. The clean side of suction filter device 85 with the clean side of its filter element F4 is connected to the bottom of the cylindrical part 77 having the passages 81.

During operation of the filter device, the bottom part 23 is immersed in a tank, such that the suction openings forming passageways are immersed. The suction valve $V_7$ is normally closed, as there is no need for suction, by applying pressure via the passages 80. The closing spring 78 acts on the closing body 79 of the counterbalance valve $V_6$ in the closed position, resulting in the connection between the clean side chamber 57, i.e. the clean side 1, to the tank side via the outlets 25, being locked. Once the desired prestressing pressure, i.e. the supply system pressure for the supply port B, in this case by 0.5 bar, has been reached, the counterbalance valve $V_6$ opens, resulting in the closing body 79 opening the connection between the clean side chamber 57 and the outlets 25. If the pressure in the clean side chamber 57 is too low and the counterbalance valve $V_6$ is thus closed, the closure body 82 of the suction valve $V_7$ is lifted, resulting in a suction flow from the filter element F4 via the spring housing and the passages 80 into the closure member 79 of the counterbalance valve $V_6$. Under normal operating conditions where there is no need for suction, the operation of this exemplary embodiment corresponds to that of the example described above.

While various embodiments have been chosen to illustrate the invention, it will be understood by those skilled in the art that various changes and modifications can be made therein without departing from the scope of the invention as defined in the claims.

The invention claimed is:

1. A filter device, comprising:
   a first port connectable to a hydraulic operating circuit;
   a tank or return port;
   a first filter element in fluid communication with said first port;
   a second port connectable to a leak-oil flow from hydraulic components;
   a first check valve being in a first line connecting said first and second ports in fluid communication and being openable toward said first port to allow leakage oil from said second port to be conveyed to said first filter element if pressure at said first port fails to exceed a first predetermined working pressure; and
   a second check valve being connected in a second line connecting in fluid communication said second port and said tank or return port and being openable when a desired range of leakage pressure at said second check valve is exceeded connecting said second port to said tank or return port, said second line being parallel to a line in which said first filter element is located.

2. A filter device according to claim 1 wherein said first check valve connects said first and second ports in fluid communication when leak-oil pressure at said second port exceeds the working pressure at said first port.

3. A filter device according to claim 1 wherein a second filter element is in said second line and has a filter grade coarser than a filter grade of said first filter element, said first filter element being in fluid communication between said first port and said tank or return port.

4. A filter device according to claim 3 wherein a third check valve is in a third line connecting said first port to said second port in fluid communication and is openable as soon as a pre-determined maximum value of the working pressure at said first port is exceeded, thereby by bypassing said first filter element via said second filter element.

5. A filter device according to claim 3 wherein a fourth check valve is in a fourth line connecting said second port to said tank or return port in fluid communication and bypassing said second filter element when said fourth check valve opens upon pressure being applied to said second port.

6. A filter device according to claim 5 wherein a strainer is located in said fourth line.

7. A filter device according to claim 3 wherein a supply port is connected to a clean side of at least one of said first filter element or said second filter element to feed filtered hydraulic fluid to hydrostatic components connectable to said supply port.

8. A filter device according to claim 7 wherein said supply port is connected to said tank or return port via replenishment lines having a fifth check valve therein as a suction valve and having a sixth check valve therein preloading hydraulic fluid at said supply port.

9. A filter device according to claim 8 wherein said replenishment lines have a suction filter therein filtering replenishment fluid volumes conveyed therethrough, said suction filter being connected in series with said fifth check valve.

10. A filter device according to claim 3 wherein a filter housing receives said first and second filter elements therein and defines a longitudinal axis, said first filter element being a microfilter, said first and second filter elements being arranged sequentially and interconnected in said filter housing.

11. A filter device according to claim 10 wherein said filter housing comprises a removable head piece and a bottom part, said first filter element being adjacent said head piece, said second filter element being adjacent said bottom port.

12. A filter device according to claim 11 wherein upper and lower fluid chambers are formed between an inner side of said filter housing and outer sides of filter media between said first and second filter elements inside said filter housing and are separated by a seal at a transition area of said first and second filter elements, said upper fluid chamber being adjacent said first fluid element, said lower fluid chamber being adjacent to said second filter element.

13. A filter device according to claim 12 wherein said first and second check valves are disposed is said transition area.

14. A filter device according to claim 2 wherein each of said first and second filter elements comprises an external filter medium surrounding a support body forming a clean-side chamber between a fluid-permeable outer wall and a closed inner wall of the respective support body, each clean-side chamber forming a clean side of the respective filter element for receiving filtered hydraulic fluid.

15. A filter device according to claim 14 wherein said closed inner walls of said support bodies form an inner tube providing a continuous fluid path from said head piece to said bottom part.

16. A filter device according to claim 15 wherein said first and second ports and fluid guides connecting said first port to said upper fluid chamber and said second port to said continuous fluid path in said inner tube formed by said closed inner walls of said support bodies are provided of said head piece.

17. A filter device according to claim 11 wherein a third check valve is in a third line connecting said first port to said second port in fluid communication and is openable as soon as a pre-determined maximum value of the working pressure at said first port is exceeded, thereby by bypassing said first filter element via said second filter element; and said third check valve is located between said first and second ports in said head piece.

18. A filter device according to claim 14 wherein said clean-side chambers inside said support bodies are connected in fluid communication to said tank or return port via fluid paths in said bottom part of said filter housing.

19. A filter device according to claim 15 wherein a fourth check valve is in a fourth line connecting said second port to said tank or return port in fluid communication and bypassing said second filter element when said fourth check valve opens upon pressure being applied to said second port; and said fourth check valve is in said bottom part of said filter housing and normally closes said inner tube in said support bodies or closes an outlet of said inner tube leading to said tank or return port upon said fourth check valve being actuated by fluid pressure.

20. A filter device according to claim 19 wherein a strainer is located in said fourth line; and said strainer is disposed upstream of said fourth check valve at an end of said inner tube.

21. A filter device according to claim 11 wherein a supply port is connected to a clean side of at least one of said first filter element or said second filter element to feed filtered hydraulic fluid to hydrostatic components connectable to said supply port;

said supply port is connected to said tank or return port via replenishment lines having a fifth check valve therein as a suction valve and having a sixth check valve therein preloading hydraulic fluid at said supply port; and said fifth check valve is provided at outlets of said bottom port of said filter housing.

22. A valve device according to claim 21 wherein an additional outlet leading to said tank or return port is provided in said bottom part of said valve housing; and said sixth check valve is a counterbalance valve and connects clean sides of said first and second filter elements to said additional outlet in said bottom part upon reaching a desired amount of preloading.

23. A valve device according to claim 21 wherein a suction filter is in said replenishment lines between said outlets of said bottom part of said valve housing and said tank or return port, said tank or return port being closable by said suction valve.

24. A valve device according to claim 21 wherein said supply port is on said head piece and is connected in fluid communication to openings in an upper end cap on said first filter element via fluid guides to form access to clean-side chambers inside support bodies in said first and second filter elements.

25. A filter device according to claim 1 wherein the hydraulic operating circuit is connected to said first port; and the hydraulic components are connected to said second port.

\* \* \* \* \*